United States Patent [19]
Cok et al.

[11] Patent Number: 5,801,710
[45] Date of Patent: Sep. 1, 1998

[54] COMPUTER PROGRAM PRODUCT FOR DEFINING A SOFT EDGE IN A DIGITAL MASK

[75] Inventors: David R. Cok, Rochester; Barry Hendy, Penfield; Michael A. Inchalik, Hilton, all of N.Y.

[73] Assignee: Eastman Kodak Company, Rochester, N.Y.

[21] Appl. No.: 699,316

[22] Filed: Aug. 19, 1996

[51] Int. Cl.⁶ ........................................... G06T 5/00
[52] U.S. Cl. .................. 345/440; 345/433; 345/435
[58] Field of Search ................... 345/431, 433, 345/435, 443, 440, 445

[56] References Cited

U.S. PATENT DOCUMENTS

| | | | |
|---|---|---|---|
| 4,107,780 | 8/1978 | Grimsdale et al. | 364/521 |
| 4,482,893 | 11/1984 | Edelson | 340/723 |
| 4,943,801 | 7/1990 | Oguchi | 340/723 |
| 5,060,171 | 10/1991 | Steir et al. | 364/521 |
| 5,294,984 | 3/1994 | Mori et al. | 358/160 |
| 5,611,027 | 3/1997 | Edgar | 345/431 |

*Primary Examiner*—Almis R. Jankus
*Attorney, Agent, or Firm*—Peyton C. Watkins

[57] ABSTRACT

A computer program product for creating a soft edge in digital images comprises a computer readable storage medium having a computer program stored thereon for performing the steps of independently receiving a transition width that indicates the width of the soft edge from a computer interface; independently receiving a desired position of a hard-edged boundary from the computer interface; receiving a function of the soft edge which uniquely corresponds a pixel value to a scaled pixel location in the digital image from the computer interface; and calculating an absolute profile of the soft edge, which uniquely corresponds a pixel value to a pixel location in the digital image, from the received transition width, position of the hard-edged boundary and function.

9 Claims, 6 Drawing Sheets

COMPUTER PROGRAM PRODUCT FOR DEFINING A SOFT EDGE IN A DIGITAL MASK

CROSS REFERENCE TO RELATED APPLICATIONS

The present application is related to U.S. application Ser. No. 08/800,892, filed Feb. 12, 1997, pending by David R. Cok, and entitled, "A COMPUTER PROGRAM PRODUCT FOR INPUTTING A PREDETERMINED SOFT EDGE INTO A DIGITAL MASK".

FIELD OF THE INVENTION

The invention relates generally to the field of creating soft edges in digital masks and, more particularly, to creating such edges independently of re-drawing an edge profile upon modifying either a transition width or position of the soft edge with respect to a hard edge.

BACKGROUND OF THE INVENTION

Computer programs for editing either moving or still images typically include creating a digital mask or matte for defining the portions of the image which are to be modified, such as the portion of the image to have color adjustments. The mask includes a plurality of pixels having either a value of one or zero (binary) for either completely enabling the editing operation at pixels having a preselected value, for example one, and for completely disabling the editing operation at pixels having a value of zero.

A typical method, which defines the boundary between the portion of the image which is to be edited and the portion which is not to be edited, includes drawing geometric objects, such as circles and polygons, on the mask. The geometric objects are generally referred to in the art as hard edges.

It may also be desirable to create a "soft edge" on the mask for defining portions of the image which are to be partially modified by the editing operation in proportion to the pixel values, generally referred to in the art as a gray-scale mask, so as to create a gradual transition between the modified and non-modified portions. The pixels in a gray scale mask typically include a range of values between completely off and completely on each of which pixel values indicate the proportion to which the pixel is to be modified.

The soft edge includes a transition width for defining the boundary of the partially modified pixels, and includes a function, such as linear or Gaussian function, defined within the transition width for defining the proportionality of pixel values within the soft edge. The transition is also positioned with respect to the original hard edge.

Although the presently known and utilized method and system are satisfactory, they are not without drawbacks. Once a soft edge with its hard edge therein is defined, if the user wishes to view different widths or position of the hard edge before printing, the edge profile must be re-drawn. This is obviously time consuming, tedious, and labor intensive.

Consequently, a need exists for an improved method and system for overcoming the above-described drawbacks.

SUMMARY OF THE INVENTION

The present invention is directed to overcoming one or more of the problems set forth above. Briefly summarized, according to one aspect of the present invention, the invention resides in a computer program product for creating a soft edge in digital images, comprising: a computer readable storage medium having a computer program stored thereon for performing the steps of: (a) receiving a transition width that indicates the width of the soft edge from a computer interface; (b) independently receiving a desired position of a hard-edged boundary from the computer interface; (c) independently receiving a profile function which uniquely corresponds a pixel value to a scaled pixel location in the digital image from the computer interface; and (d) calculating a profile of the soft edge, which uniquely corresponds a pixel value to a pixel location in the digital image, from the received transition width, position of the transition and profile function.

It is an object of the present invention to overcome the above-described drawbacks.

It is an advantage of the present invention to create a user-friendly software program for defining soft edges.

It is a feature of the present invention to provide independent selection of transition width, profile function and transition position.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

In addition, a computer readable storage medium as used herein includes magnetic storage media such as a magnetic disc (such as a floppy disk) or magnetic tape; optical storage media such as optical disc, optical tape, or machine readable bar code; solid state electronic storage devices such as random access memory (ROM), or read only memory (RAM); or any other physical device or medium employed to store a computer program.

Figure 1:
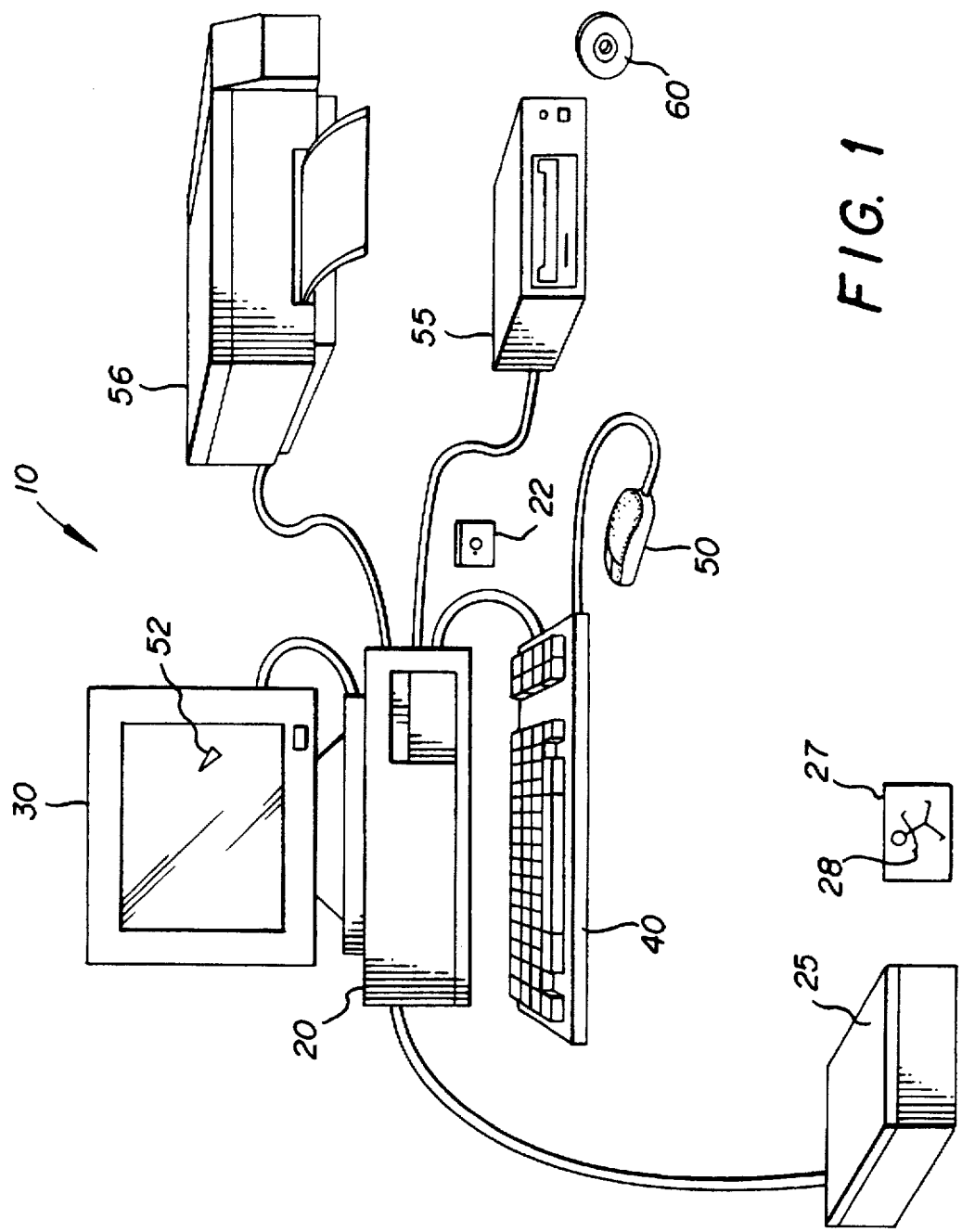
FIG. 1 is a perspective view of a computer system for implementing the present invention.

Referring now to the drawings, and particularly to FIG. 1, there is illustrated a computer system 10 which may be used for implementing the present invention. Although the computer system 10 is shown utilizing a still photograph, the present invention is not limited to still photographs, but may also be used on moving pictures as will be apparent to those skilled in the art. The computer system 10 includes a microprocessor based unit 20 for receiving and processing software programs and for performing other processing functions. Software programs may be received by the microprocessor based unit 20 either from a floppy disk 22 which is inserted into the microprocessor based unit 20, or pre-programmed into memory 23 contained in the microprocessor based unit 20.

A scanner 25 is electrically connected to the microprocessor based unit 20 for digitizing a photographic image 27 that is placed on the scanner 25, and for sending the digitized image to the microprocessor based unit 20. The digitized image contains a plurality of pixels each having a value typically between a minimum value (for example 0) and a maximum value (for example 255).

A display 30 is electrically connected to the microprocessor based unit 20 for displaying user-related information associated with the software. A keyboard 40 is also connected to the microprocessor based unit 20 for allowing a user to input information to the software. As an alternative to using the keyboard for input, a mouse 50 may be used for moving a selector 52 on the display 30 and for selecting an item on which the selector 52 overlays, such as generally referred to in the art as cutting, copying and pasting, or adjusting a user-interface object such as a slider.

An alternative method of inputting software programs to the microprocessor based unit 20 includes connecting a compact disk- read only memory (CD-ROM) 55 to the microprocessor based unit 20 for receiving software programs and for providing a means of inputting the software programs and other information to the microprocessor based unit 20. The CD-ROM receives the software via a compact disk 60 on which the software program is stored and which is inserted into the CD-ROM 55. A printer 56 is connected to the microprocessor based unit 20 for printing a hardcopy of the output of the computer system 10.

Figure 2:
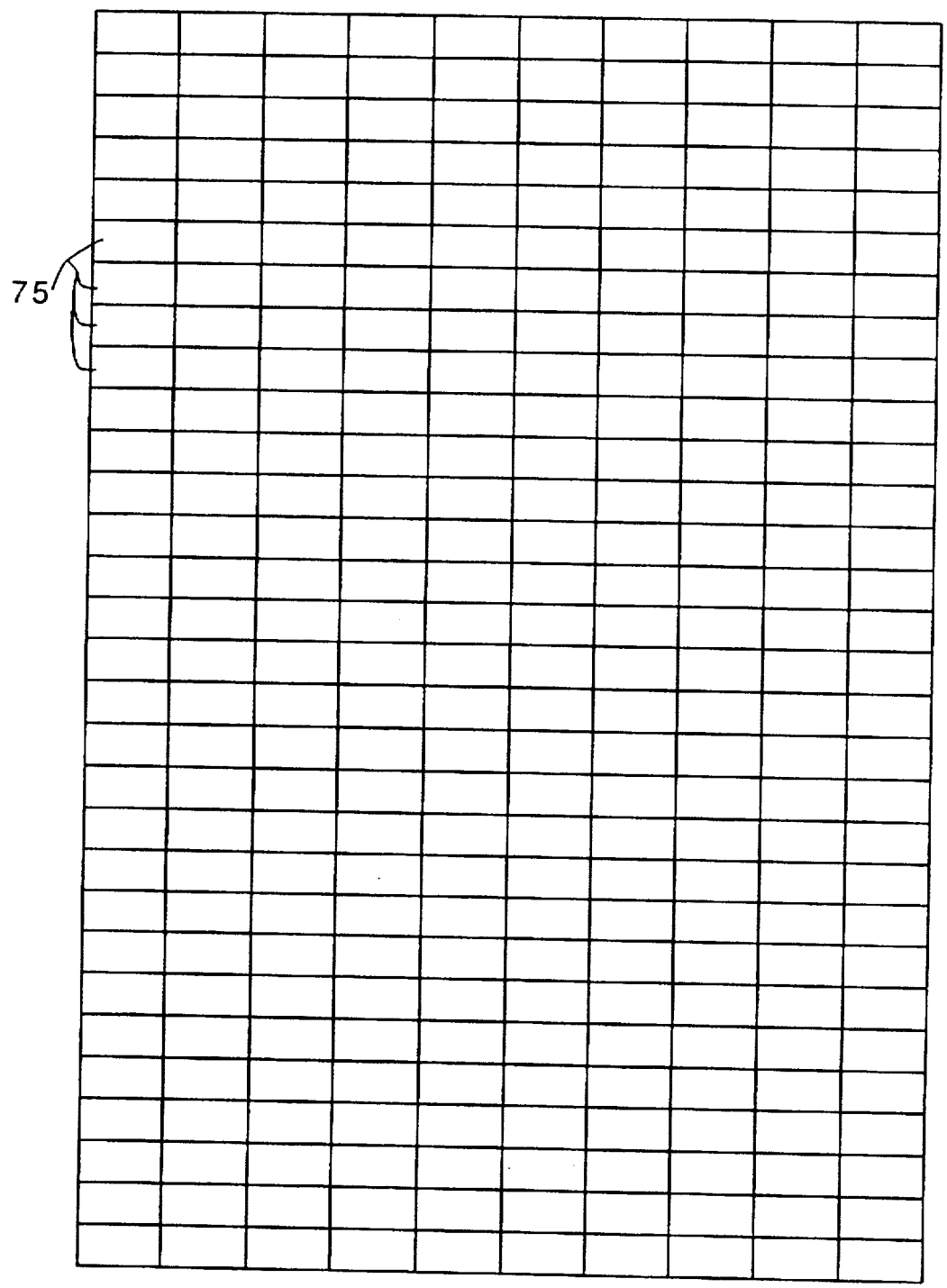
FIG. 2 is an illustration of a digitized image.

Referring to FIG. 2, it is instructive to note that the digital representation 70 of the image is stored in memory 23, and is sent to the monitor 30 for visually displaying the image, as is well known in the art. The input devices 40 and 50 permit various editing changes to be input to software of the present invention, which changes are then visually displayed on the monitor 30, and are actually implemented on the digital representation 70 of the image. As previously-described, the digital representation 70 includes a plurality of pixels 75 typically having values between 0 and 255.

Figure 3:
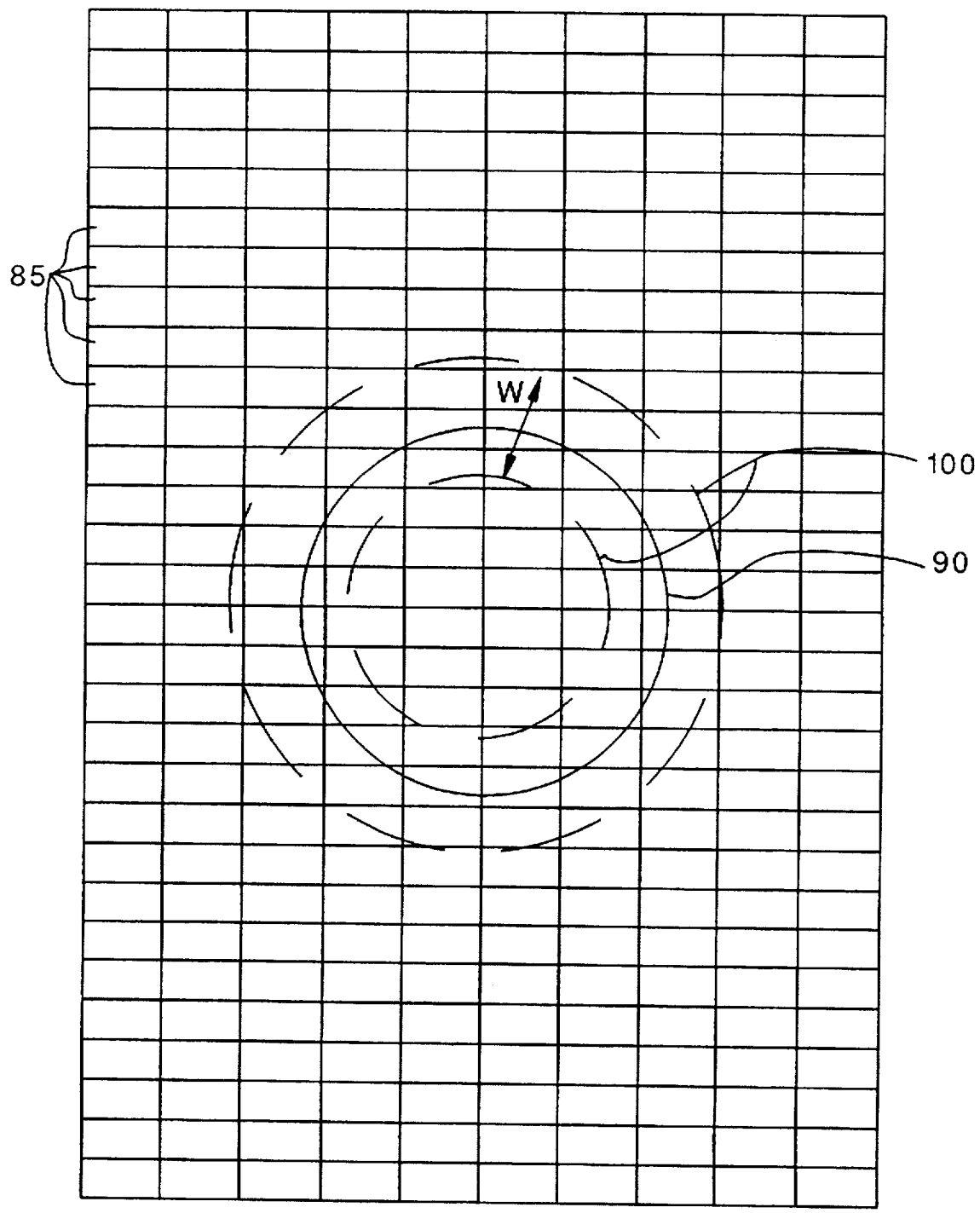
FIG. 3 is an illustration of a digitized mask.

Referring to FIG. 3, the software of the present invention creates a gray-scale mask 80 having a plurality of pixels 85 having either a value of one or zero for either completely enabling the editing operation at pixels having a preselected value, for example one, or for completely disabling the editing operation at pixels having a value of zero. It also includes a plurality of pixels 85 having values higher than 0 and less than 1 for defining portions of the mask 80 which are to be modified in proportion to the pixel value, as will be described in detail below. It is instructive to note that the values 1 and 0 are representative of a maximum (on) value and a minimum (off) value.

Figure 4:
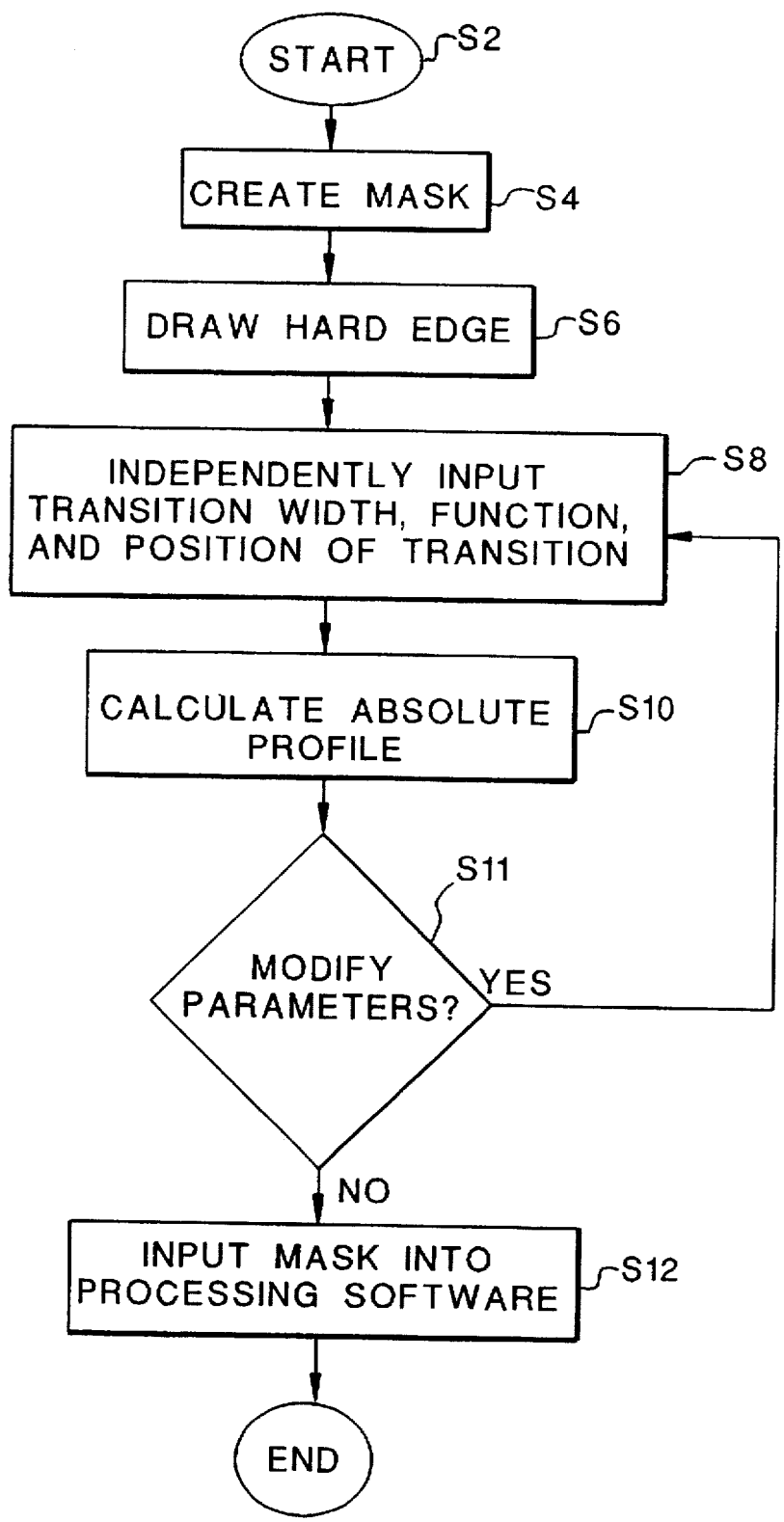
FIG. 4 is a flowchart of a software program of the present invention.

Referring specifically to the FIG. 4, there is illustrated a flowchart of software of the present invention. However, before discussing the software program of the present invention, it is instructive to note that the software program of the present invention also conjunctionally uses any standard image processing software, such as "ADOBE PHOTOSHOP" software, for implementing editing changes in proportion to that indicated by the software of the present invention.

The software is initiated S2 for displaying the image on the monitor 30. A mask 80 of the image is created S4 from the digital representation and input into a buffer, or memory 23. The mask 80 initially includes a plurality of pixels having values which are all the same value, for example zero. The user inputs a hard edge S6 by drawing a geometric object 90, such as a circle or polygon, for distinguishing between the portion which is to be modified, and the portion which isn't to be modified. The portion enclosed by the geometric object preferably represents the portion to be modified by the processing software, and the pixels outside the object represent the portion that is not to be modified (see FIG. 3), or vice versa.

Figure 5:
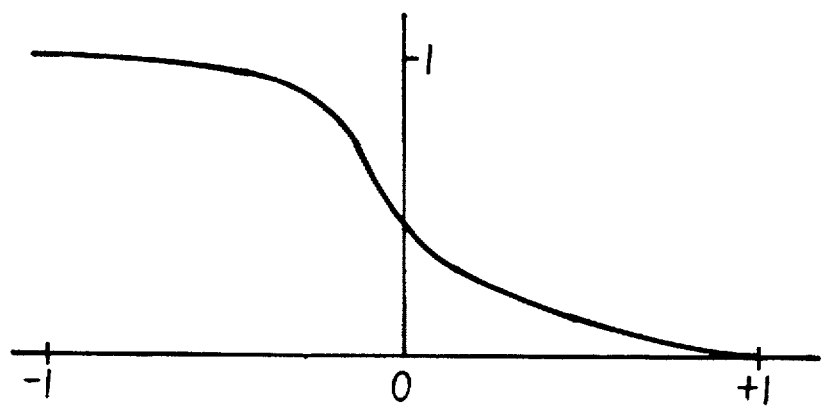
FIG. 5 is graph illustrating a function input to the software of the present invention.

A pull-down menu or some other software mechanism is displayed for independently inputting S8 three parameters of the soft edge of the image: the transition width, position of the hard edge within the transition width and the profile function giving the shape of the soft edge. As illustrated in FIG. 3, a soft edge defines portions of the image which are to be partially modified by the editing operation in proportion to the pixel values. The soft edge 100 includes a transition width (w) for defining the boundary of the partially modified pixels, and includes a profile function, such as linear, Gaussian or user defined function, therein for defining the proportionality of the pixel values within the soft edge. The function is scaled so that the transition width to which it is fitted is defined between negative one and positive one, as illustrated in FIG. 5. The function includes values between zero and one as defined by the particular function selected.

Figure 6:
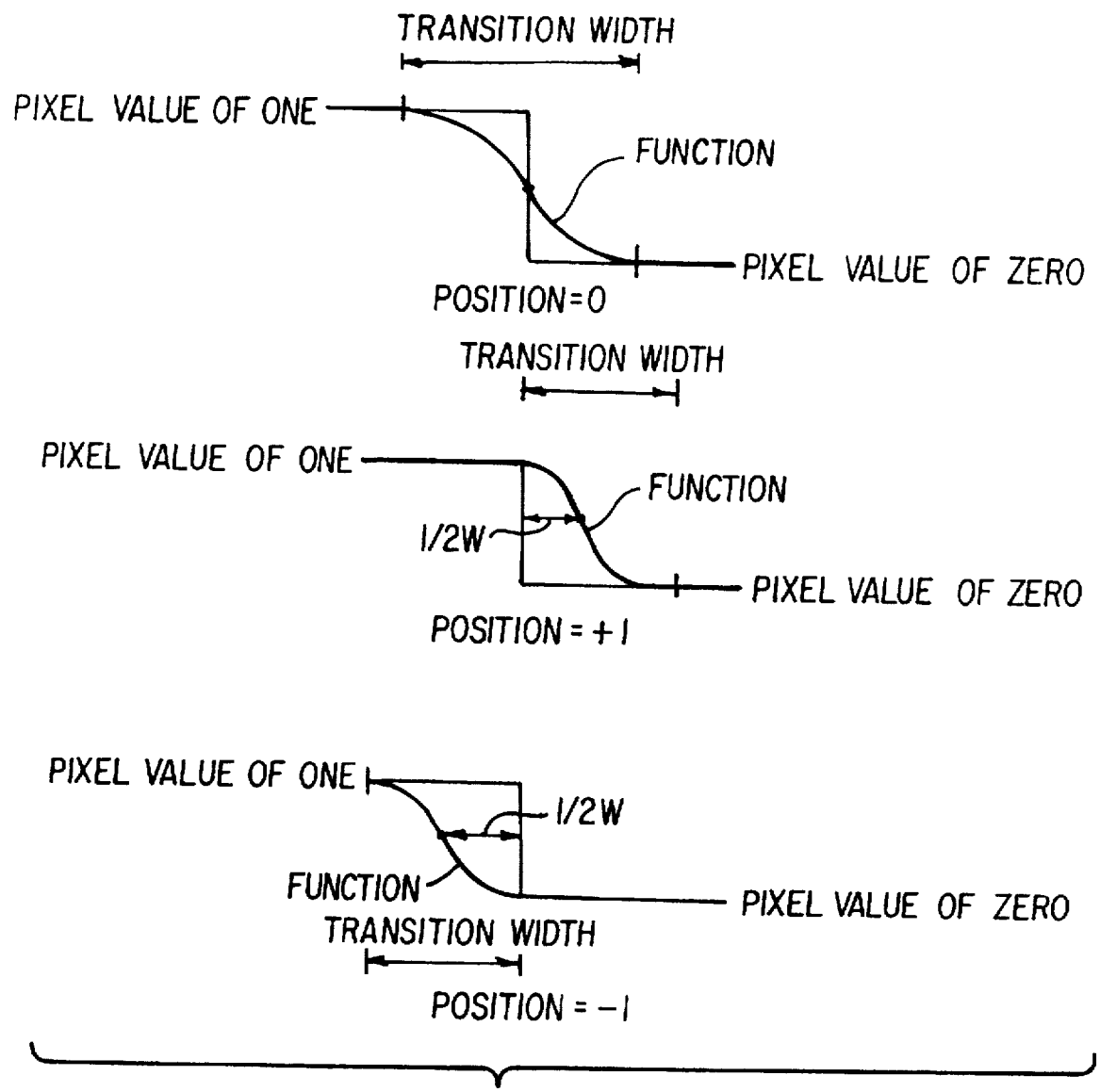
FIG. 6 is graphs illustrating positions of a hard edge which may be input to the software of the present invention.

The position of the hard edge is input as a fraction of half-width of the transition width, as illustrated in FIG. 6. For example, a position of zero indicates a hard edge in the center of the transition width; a position of positive one indicates a hard edge directly on the inner edge of the soft edge; and a position of negative zero indicates a hard edge directly on the outer edge of the transition width.

An absolute profile is calculated S10 from the above-described parameters by the following equation:

$$F(d) = f\left(\frac{d}{\frac{1}{2}w} - p\right)$$ EQ. 1 where d is the number of pixels from the hard edge;

w is the transition width;

x is the scaled value of the transition width for the selected function;

p is the position of the soft-edged boundary in the digital image relative to the hard-edged boundary, scaled by the transition width;

F is the absolute profile as a function of the distance from the hard edge; and f is the profile function.

Figure 7:
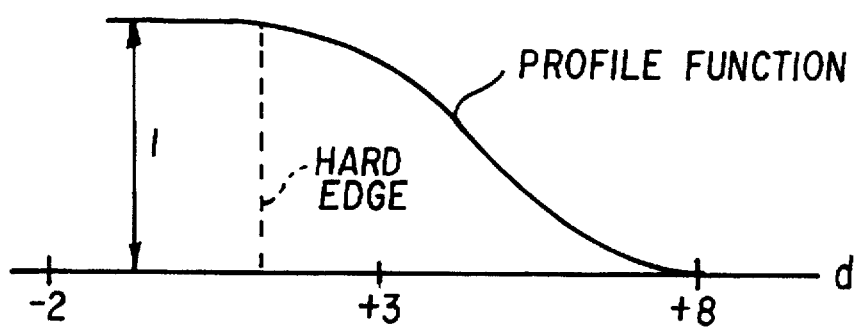
FIG. 7 is a graph of a calculated absolute profile of the present invention.

Referring briefly to FIG. 7, the absolute profile is illustrated having an abscissa as the number of pixels from the hard edge, and having an ordinate as the value of the pixel given its distance from the hard edge. For example, given a transition width of 10 pixels, a position of the hard edge relative to the transition width of +0.6, and a scaled value for the function of 1.0, d is +8 pixels; for a scaled value of 0, d is +3 pixels; and for a scaled value of −1.0, d is −2 pixels.

The pixels in the soft edge region of the mask are populated with the values from the absolute profile. The mask is then retrieved S12 by the image processing software for modifying the image according to the mask profile.

To re-do the mask S11, the pull-down menu is retrieved and either the transition width or position of the hard edge is modified, and the absolute profile is re-calculated by the above-described method without re-drawing the hard edge.

The invention has been described with reference to a preferred embodiment. However, it will be appreciated that variations and modifications can be effected by a person of ordinary skill in the art without departing from the scope of the invention.

Parts List:
10 computer system
20 microprocessor based unit
22 floppy disk
23 memory
25 scanner
27 photographic image
30 display
40 keyboard
50 mouse
52 selector
55 compact disk-read only memory (CD-ROM)
56 printer
60 compact disk
70 digital representation
75 pixels
80 gray-scale mask
85 pixels
90 geometric object
100 soft edge

What is claimed is:

1. A computer program product for creating a soft edge in digital images, comprising: a computer readable storage medium having a computer program stored thereon for performing the steps of:
   (a) independently receiving a transition width that indicates the width of the soft edge from a computer interface;
   (b) independently receiving a desired position of a transition width relative to a hard-edged boundary from the computer interface;
   (c) receiving a profile function which uniquely corresponds a pixel value to a scaled pixel location in the digital image from the computer interface; and
   (d) calculating an absolute profile of the soft edge, which uniquely corresponds a pixel value to a pixel location in the digital image, from the received transition width, position of the transition width and profile function, wherein the absolute profile is calculated substantially by the equation:

$$F(d) = f\left(\frac{d}{\frac{1}{2}w} - p\right);$$

where d is the distance of the pixel from the hard edge in the digital image measured in pixels; w is the width of the transition; p is the position of the soft-edged boundary in the digital image relative to the hard-edged boundary, scaled by the transition width; F is the absolute profile as a function of the distance from the hard edge; and f is the profile function.

2. The computer program product as in claim 1 further comprising generating the hard edge boundary from the computer interface.

3. The computer program product as in claim 2 further comprising receiving either a revised transition width or position of the hard edge, and re-calculating the absolute profile without re-drawing the hard edge.

4. An apparatus for creating a soft edge in digital images comprising:
   a) means for independently receiving a transition width that indicates the width of the soft edge from a computer interface;
   (b) means for independently receiving a desired position of a hard-edged boundary from the computer interface;
   (c) means for receiving a profile function of the soft edge which uniquely corresponds a pixel value to a scaled pixel location in the digital image from the computer interface; and
   (d) means for calculating an absolute profile of the soft edge, which uniquely corresponds a pixel value to a pixel location in the digital image, from the received transition width, position of the hard-edged boundary and function, wherein said absolute profile means is calculated substantially by the equation:

$$F(d) = f\left(\frac{d}{\frac{1}{2}w} - p\right);$$

where d is the distance of the pixel from the hard edge in the digital image measured in pixels; w is the width of the transition; p is the position of the soft-edged boundary in the digital image relative to the hard-edged boundary, scaled by the transition width; F is the absolute profile as a function of the distance from the hard edge; and f is the profile function.

5. The apparatus as in claim 4 further comprising means for generating the hard edge boundary from the computer interface.

6. The apparatus as in claim 5 further comprising means for receiving either a revised transition width or position of the hard edge, and re-calculating the profile without re-drawing the hard edge.

7. A method for creating a soft edge in digital images, comprising the steps of:
   (a) independently receiving a transition width that indicates the width of the soft edge from a computer interface;
   (b) independently receiving a desired position of a transition width relative to a hard-edged boundary from the computer interface;
   (c) receiving a profile function which uniquely corresponds a pixel value to a scaled pixel location in the digital image from the computer interface; and
   (d) calculating an absolute profile of the soft edge, which uniquely corresponds a pixel value to a pixel location in the digital image, from the received transition width, position of the transition width and profile function, wherein the absolute profile is calculated substantially by the equation:

$$F(d) = f\left(\frac{d}{\frac{1}{2}w} - p\right);$$

where d is the distance of the pixel from the hard edge in the digital image measured in pixels; w is the width of the transition; p is the position of the soft-edged boundary in the digital image relative to the hard-edged boundary, scaled by the transition width; F is the absolute profile as a function of the distance from the hard edge; and f is the profile function.

8. The method as in claim 7 further comprising the step of generating the hard edge boundary from the computer interface.

9. The method as in claim 8 further comprising the step of receiving either a revised transition width or position of the hard edge, and re-calculating the absolute profile without re-drawing the hard edge.

* * * * *